United States Patent [19]

Strutman

[11] 4,239,977
[45] Dec. 16, 1980

[54] SURGE-ACCEPTING ACCUMULATOR TRANSMISSION FOR WINDMILLS AND THE LIKE

[75] Inventor: Warren A. Strutman, St. Louis, Mo.

[73] Assignees: Lisa Strutman, Boone County; Lauren Strutman; Jerome A. Gross, both of St. Louis County, all of Mo. ; a part interest to each

[21] Appl. No.: 946,199

[22] Filed: Sep. 27, 1978

[51] Int. Cl.$^3$ ............... F03D 9/00; H02P 9/04; F16D 31/02
[52] U.S. Cl. ................... 290/44; 290/55; 60/398
[58] Field of Search ............ 290/44, 55; 416/43, 416/32, 133; 60/398

[56] References Cited

U.S. PATENT DOCUMENTS

| | | | |
|---|---|---|---|
| 3,973,873 | 8/1976 | Shank | 416/43 |
| 4,112,311 | 9/1978 | Theyse | 290/44 |
| 4,160,170 | 7/1979 | Harner et al. | 290/44 |

Primary Examiner—J. V. Truhe
Assistant Examiner—John B. Conklin
Attorney, Agent, or Firm—Jerome A. Gross

[57] ABSTRACT

An alternator, powered by a wind rotor having pitch changeable blades, is maintained at a fixed speed despite variations in wind speed and cyclic perturbations in rotor shaft speed due to rotor dynamics. In one embodiment, a geared speed increaser, coupling the rotor to the alternator, is mounted for reversible rotation relative to the rotor shaft. A fluid transfer means, such as a torque motor, coupled to a pressurized accumulator, applies such a torsional reaction to the speed increaser to permit its rotation at a rate which accommodates the difference between the instantaneous rotor shaft speed and that rotor shaft speed corresponding to the alternator's fixed speed. The fluid transfer means and accumulator means together permit a maximum angular displacement of the speed increaser sufficient to provide a time interval in which the rotor blade pitch may be corrected and the rotor shaft returned to normal speed. Pitch changes are effected, in part, responsive to rotation of the speed increaser.

11 Claims, 6 Drawing Figures

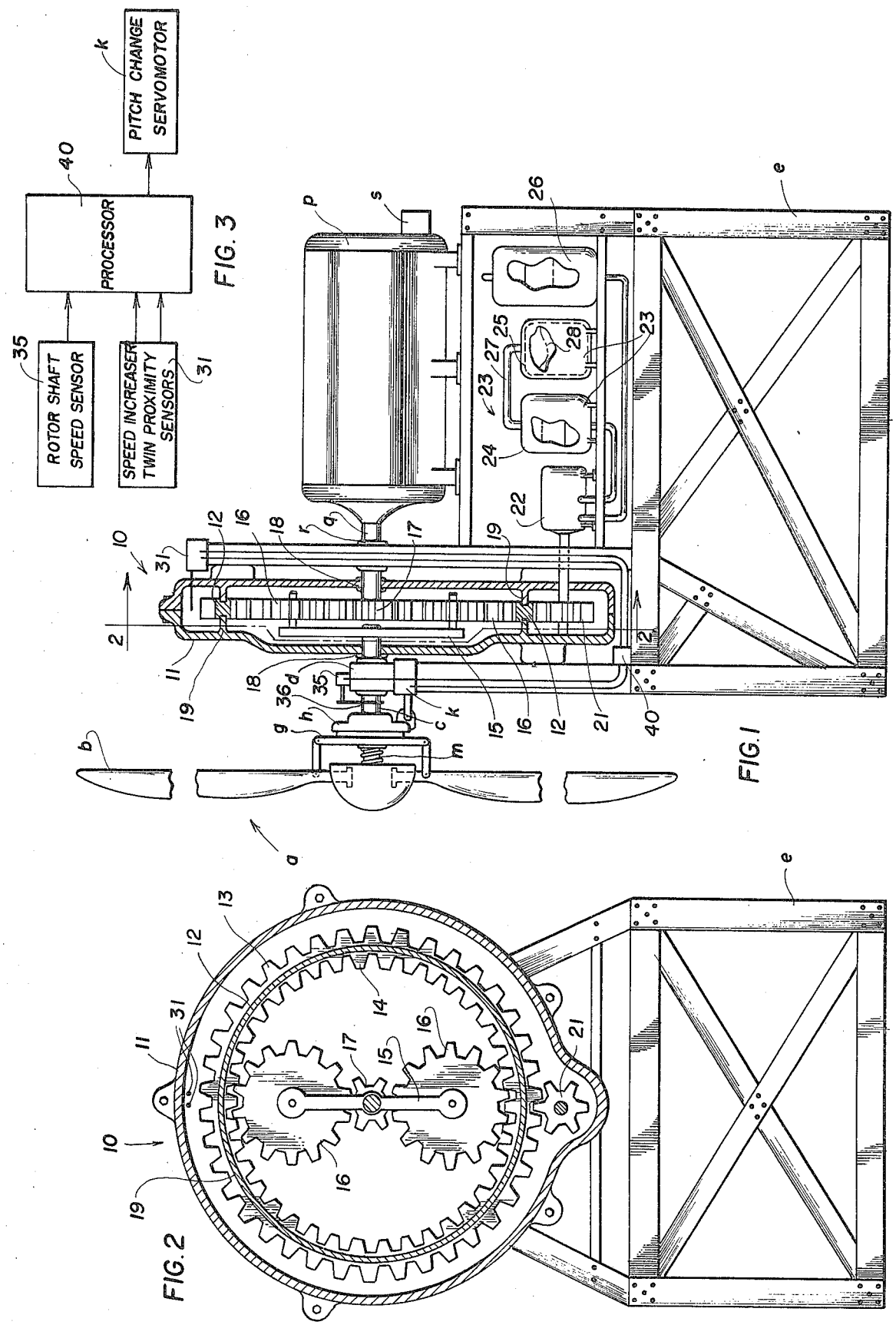

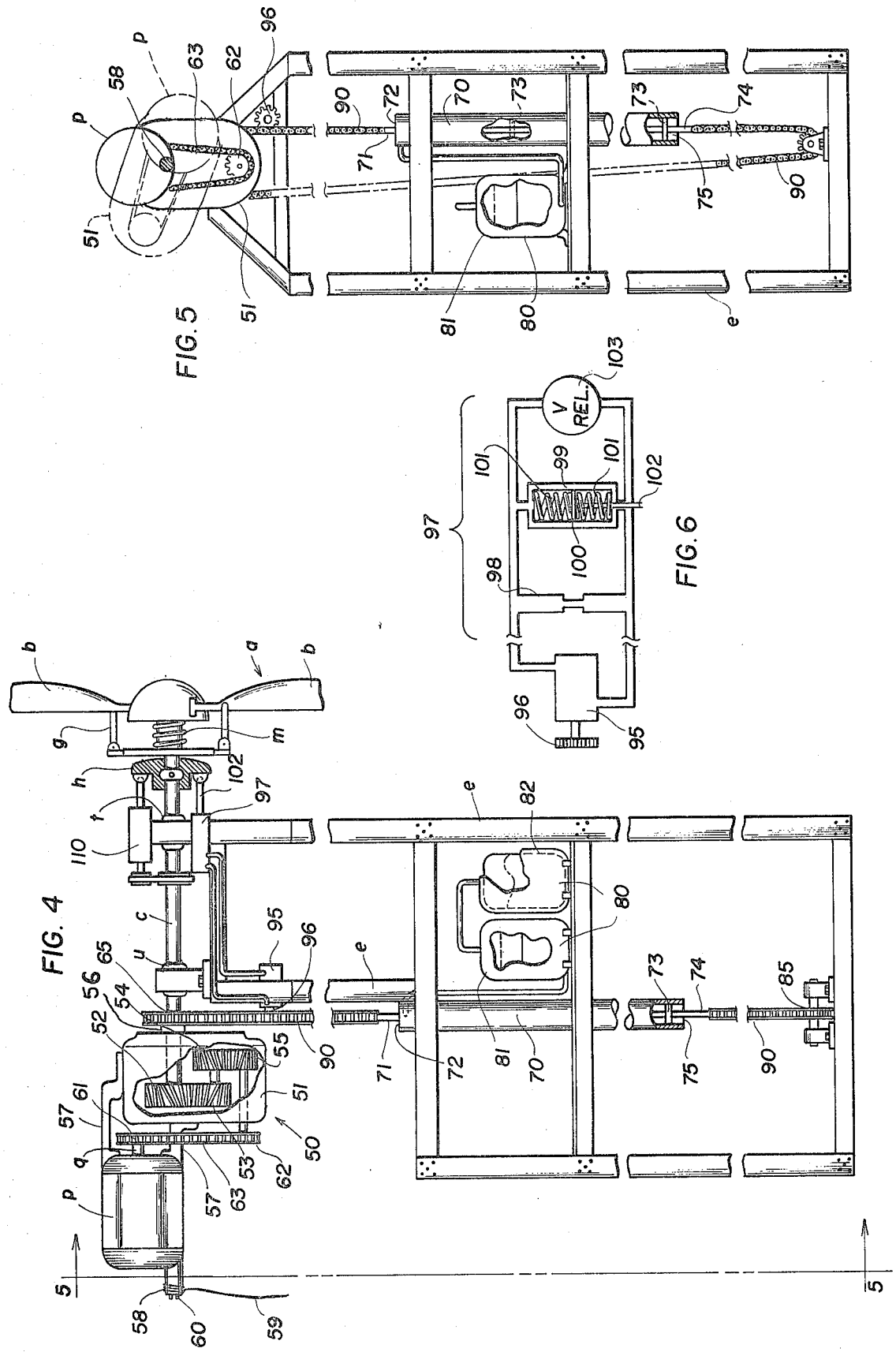

SURGE-ACCEPTING ACCUMULATOR TRANSMISSION FOR WINDMILLS AND THE LIKE

BACKGROUND OF THE INVENTION

The present invention relates to wind-powered generators, and more specifically to wind-powered alternators to be operated at a fixed frequency.

Large-diameter wind-powered alternators, which typically utilize a 4-pole alternator and operate at slow wind-rotor speeds, utilize speed increasers, with a gear ratio such as 1:45, to drive the alternator at snychronous speed, producing alternating current in synchronization with an electric utility grid. A small change in rotor speed caused by wind gusts and lulls, mulitiplied by the speed increaser, may force the alternator out of synchronization, causing it to experience torque reversals which are unsuitable for reliable power generation and which might destroy the alternator. Even more minute changes in rotor speed, as caused by gravitational forces on the somewhat flexible rotor blades, and the wind wake as the wind rotor rotates near the windmill support tower, cause unsuitable current spikes.

Attempted solutions to these problems have included use of slip clutches, torsionally flexible drive shafts and oversized alternators capable of absorbing and resisting the sudden increased torque and power delivered by the wind rotor. Wind-powered alternator systems with adjustable rotor blade pitch may be used to achieve alternator synchronization, but cannot accommodate sudden changes in rotor shaft speed due to the substantial interval required to make pitch changes. Control systems with wind-speed sensors upwind of the rotor which anticipate wind-speed changes have not been found to be adequate to correct for sudden gusts and lulls, and cannot compensate for cyclic perturbations in rotor shaft speed due to gravitational forces on the rotor or the tower wake.

SUMMARY OF THE INVENTION

An object of the present invention is to provide a wind-rotor-driven alternator which operates substantially at a constant synchronous speed regardless of variations in rotor shaft angular velocity. Another object is to provide such a wind-rotor-driven alternator which may be maintained in synchronization with an electric utility grid even though there may be sudden changes in rotor speed during gusty wind conditions or small but significant cyclic fluctuations or perturbations in rotor shaft speed. A still further object is to provide for tracking a wind-generator to the actual frequency of a grid or of another generator in the system.

Briefly summarizing, the present invention is comprised of a wind rotor having blades of adjustable pitch, an alternator, and a speed increaser coupling the rotor to the alternator to drive it at synchronous speed for delivery of A.C. power at a desired frequency, i.e., the grid frequency. In the more simple embodiment (the second of the two described herein), the speed increaser is mounted for rotation relative to the rotor shaft and the alternator is mounted onto the speed increaser; rotation of the speed increaser is controlled by application of a torsion reaction, such as by gearing the speed increaser case to a torque motor. The torque motor is so interposed in fluid connection between a pressurized accumulator and a fluid reservoir as to provide a torque of such magnitude and direction as will cause or permit rotation of the speed increaser; this rotation is at a rate which accommodates the difference between the instantaneous rotor shaft speed and the normal rotor shaft speed corresponding to the synchronous speed of the alternator. The permitted angular displacement of the speed increaser, which may exceed 360°, provides a time interval sufficient to make blade pitch changes and return the wind-rotor to its normal speed. The angular position of the speed increaser corresponds to the power delivered by the rotor to the alternator; therefore blade pitch change may be effected responsive to changes in its position.

BRIEF DESCRIPTION OF THE DRAWINGS

FIG. 1 is a side elevation of a wind-driven generator mounted atop a support tower including a surge-accepting accumulator transmission embodying the present invention.

FIG. 2 is a cross-sectional view through the surge-accepting accumulator transmission of FIG. 1 taken along line 2—2 thereof.

FIG. 3 is a diagrammatic presentation illustrating the control system for the embodiment of the present invention shown in FIGS. 1 and 2.

FIG. 4 is a side elevation, partly broken away, of an alternative embodiment of a surge-accepting transmission, mounted on a support tower.

FIG. 5 is a cross-sectional view taken along line 5—5 of FIG. 4 showing in phantom lines the surge-accepting transmission displaced from its initial position.

FIG. 6 is a detailed schematic view of the acceleration-sensitive pitch change control system utilized in the alternative embodiment of FIGS. 4 and 5.

DESCRIPTION OF THE PREFERRED EMBODIMENT

The preferred embodiment of the present wind-driven generator, shown in FIGS. 1, 2 and 3, utilizes a conventional wind-driven rotor, generally designated a, and shown schematically, of the type having pitch-changeable rotor elements or blades b. The rotor a is mounted by its rotor shaft c to a forward support bearing d mounted atop a typical wind generator support tower e, of the type which has capability to rotate the rotor a into the wind. The rotor blade pitch is varied by a conventional pitch change mechanism including a control arm mechanism g attached to the rotor blade inner end. A positioning plate h, slidably mounted on the rotor shaft c, is slided by a pitch change servomotor k which moves the control arm mechanism g toward the rotor a as the shaft of the servomotor k is extended. In the schematic simplified embodiment shown, a compression coil spring m between the rotor a and control arm mechanism g moves the control arm mechanism g away from the rotor a when the shaft of the servomotor k is retracted.

The preferred embodiment of the present wind-driven generator utilizes a conventional alternator p, a synchronous four-pole machine designed to operate at a normal angular velocity of 1800 r.p.m., a fixed multiple of the rotor shaft normal operating angular velocity, to produce a 60 Hz alternating current. The alternator p is shown mounted on the wind generator support tower e downwind of the rotor a, with its input shaft q supported by a rear support bearing r. A conventional automatic voltage regulator s controls the field excitation to the alternator p.

The above conventional elements are utilized with the present invention to provide a surge-accepting accumulator transmission for transmitting power from the wind-driven rotor a to the alternator p. In the preferred embodiment, illustrated in FIGS. 1 and 2, power transmission is achieved by a planetary geared speed increaser, generally designated 10, made up of a cylindrical gear case 11 enclosing a ring gear 12 having outer gear teeth 13 and inner gear teeth 14, supported rotatably by ring gear support provisions 19 formed of a pair of opposed annular rings on the gear case 11. In the somewhat simplified embodiment shown, the planetary speed increaser 10 utilizes a planet carrier 15 fixedly mounted at its center to the wind-driven rotor shaft c. The planet carrier 15 has near each of its ends identical rotating planet gears 16, the planet carrier 15 and planet gears 16 being of such size as to engage the inner gear teeth 14 with both planet gears 16. A sun gear 17 is fixed to the end of the alternator input shaft q and is of such diameter as to engage both planet gears 16, its center being on a line joining their centers. A preferred speed increaser gear ratio may be 1:45. The gear case 11 is bolted to the support tower e and is positioned between the forward and the rear support bearings d, r; the rotor shaft c and alternator shaft q enter the gear case 11 through sealed bearings 18.

Means to permit resistive rotation of the speed increaser ring gear 12 relative to the rotor and alternator shafts c, q is provided by a torque reaction gear 21 inside the gear case 11, engaged to the ring gear 12. The torque reaction gear 21 is mounted on the shaft of a reversible positive displacement hydraulic or torque motor 22, the shaft passing through the gear case 11. The torque motor 22 is so coupled between a gas-pressurized two-stage hydraulic accumulator generally designated 23 and a hydraulic fluid reservoir 26 by a hydraulic line that liquid is transferred to the accumulator 23 when the gear case 11 rotates in the same direction as the rotor a, and liquid is transferred from the accumulator 23 when the gear case 11 rotates opposite the rotor a. The accumulator 23 preferably has a low-pressure first-stage accumulator 24 coupled to a bladder-type high-pressure pre-charged second-stage accumulator 25 by a coupling tube 27, of sufficiently small diameter, at least at its entrance to the high-pressure accumulator 25, that the internally pressurized bladder 28 of the second stage 25 does not distend into such entrance.

A pair of closely spaced conventional proximity sensors 31, schematically shown, are positioned adjacent the ring gear outer teeth 13; each produces an electrical signal as a gear tooth passes its end. Coupled by a toothed belt to a sheave 36 on the rotor shaft c, a rotor shaft speed indicator 35 produces an electrical output proportionate to the rotor shaft angular velocity.

The pitch change servomotor k responds both to rotor shaft speed and to the poistion and movement of the ring gear 12. As shown in FIG. 3, a conventionalelectronic processor 40 is electrically coupled to receive input signals from the pair of proximity sensors 31 and the rotor shaft speed indicator 35 and to transmit power to the pitch change servomotor k as required.

An alternative embodiment of the present invention, shown in FIGS. 4, 5 and 6, utilizes conventional elements similar to that of the preferred embodiment: a rotor a attached to a rotor shaft c and having pitch changeable rotor blades b, a blade pitch changing mechanism having a control arm mechanism g, swiveling control plate h, and return spring m, a support tower e and a four-pole alternator p having an input shaft q. In addition, the preferred embodiment has first and second aligned support bearings t, u mounted on the support tower e, to which the rotor shaft c is mounted.

These conventional elements are utilized with an alternative surge-accepting accumulator transmission, described below. The alternative embodiment is comprised of a shaft-mounted speed increaser, generally designated 50, which may be simply a conventional shaft-mounted speed reducer such as manufactured by the Dodge Division of Reliance Electric Company, driven as to serve instead as a speed increaser. Internally, the speed increaser case 51 has a low speed drive gear 52 driven by the rotor shaft c; the low speed drive gear 52 is engaged to a first driven gear 53, which is coupled by a shaft to a second drive gear 54. The second drive gear 54 is engaged to a high-speed driven gear 55 on a shaft which forms the output of the speed increaser 53. The speed increaser case 51 has a fixed flange 56 radially outward of the rotor shaft c.

The alternator p, secured to the speed increaser case 51 by spaced brackets 57, has an alternator sprocket 61 on its input shaft q and is driven by a drive chain 63 from a drive chain sprocket 62 on the shaft of the high-speed driven sprocket 55 of the speed increaser 50. The alternator p is so positioned on the speed increaser case 51 as to serve as a counterweight to balance the speed increaser as it moves angularly about the rotor shaft c. A drum 58, affixed on the alternator p at its end opposite its input shaft q concentric with the rotor shaft c, mounts a flexible electrical cable 59 which leads from terminals 60 on the alternator p, ultimately to the utility grid.

The flange 56 on the speed increaser case 51 bears, in fixed angular relation, a flange roller chain drive sprocket 65. Beneath this sprocket 65, the tower e supports an extended length vertical hydraulic cylinder 70 having a long upper piston rod 71 which extends through a seal in the upper end 72 of the cylinder 70 downward to a piston 73. A short lower piston rod 74 continues from the piston 73 through the open lower end 75 of the hydraulic cylinder 70. At its upper end, the cylinder 70 is connected by a hydraulic line to a gas-pressurized two-stage hydraulic fluid accumulator 80 mounted on the support tower e. The two-stage accumulator 80 includes a first-stage accumulator 81 connected to the cylinder 70 and coupled by a top outlet line to a second-stage bladder-type accumulator 82. The construction and operation of the two-stage accumulator 80 are similar to the accumulator 23 of the previously described embodiment.

A roller chain idler sprocket 85 is provided beneath the lower end 75 of the hydraulic cylinder 70, mounted on a shaft 86 supported by the tower e. A roller chain 90 is secured to the upper piston rod 71, passes over the roller chain drive sprocket 65, continues down and around the idler sprocket 85 and is secured to the lower end of the lower piston rod 74. Thus, rotation of the speed increaser case 51 in either direction is accompanied by movement of the hydraulic cylinder piston 73.

A small hydraulic reversible positive displacement pump 95, conveniently mounted on the tower frame e, is coupled by its pump sprocket 96 to the roller chain 90. A pair of hydraulic lines leads from the hydraulic pump 95 to an acceleration-sensitive pitch change control 97, made up of three parallel hydraulic elements, as shown in FIG. 6. First, the hydraulic lines are interconnected by an orificed passage 98. Second, they are connected by a cylindrical chamber 99 having a control input piston 100 floating between soft centering springs 101. A control arm 102 connects the control input piston 100 to the pitch change control plate h. A pressure relief valve 103, in a third passage, serves as the third parallel element.

A conventional rotor speed governor 110 is sprocket driven from the rotor shaft c and is likewise coupled to the pitch change control plate h.

In operation of the preferred embodiment of FIGS. 1, 2 and 3, beginning at an initial position in which the rotor a is at rest, the processor 40 causes the pitch change mechanism servomotor k to adjust the rotor blade pitch for easy starting. After rotation begins, the blade pitch change is adjusted for best acceleration; if sufficient wind is present the rotor a will accelerate until reaching an angular velocity of approximately 40 r.p.m., thus to rotate the alternator p at about 1800 r.p.m. Rotation causes the field of the alternator to be excited, subject to control by the automatic voltage regulator s. When the normal rotor angular velocity is reached and the alternator p reaches an angular velocity synchronous with the utility grid, the processor 40 brings the alternator onto the utility line.

The processor 40, which in part serves as a governor, sets the rotor blade pitch, via the pitch change servomotor k, so that the rotor shaft c would rotate at an angular velocity slightly greater than its normal angular velocity. The reverse electromotive force of the alternator p resists this attempted overspeeding of the rotor shaft c, thus permitting power to be delivered from the rotor a to the spinning alternator p. The electrical angle between the alternator voltage sinusoid and the utility grid voltage sinusoid, called the power angle, increases as increasing torque is applied to the alternator p.

As the rotor a begins to deliver torque to the alternator p, the ring gear 12 rotates, reacted by the reaction gear 21. As the rotor shaft torque increases and the alternator p is further excited, the torque motor 22 is rotated further and transfers fluid from the reservoir 26 to the accumulator 23, increasing the accumulator pressure, which increases the resistive torque provided by the torque reaction sprocket 21. Thus, an angular displacement of the ring gear 12, which is proportionate to the torque delivered by the rotor a to the excited alternator p builds up to a fairly substantial angular displacement corresponding to the transmission of torque to the alternator p at its normal speed within the range of design wind speeds.

The wind velocity may increase to that corresponding to the design power rating of the alternator p, with the rotor torque building up to the design value for the rotor, without lessening the rotor blade pitch. If the power of the wind on the rotor a exceeds the design value, the processor 40 causes the blades b to be partially feathered to maintain normal rotor shaft velocity without exceeding the alternator design power rating; similarly, if the wind speed drops off slightly, the blades b will temporarily be set at an increased angle to hold the alternator at its normal angular velocity though its power output is diminished.

Generally, gradual changes in wind speed are accommodated by the processor 40, which receives an indication of wind speed from the rotor shaft speed indicator 35 and causes the servomotor k to adjust the blade pitch as required. During such changes, the alternator excitation is adjusted by the automatic voltage regulator s to maintain the alternator voltage at the desired value.

Sudden changes in the instantaneous angular velocity of the rotor shaft c are compensated for by further displacements, in either direction, of the surge-accepting accumulator transmission. These changes include large disturbances due to wind gusts and lulls and smaller cyclic interferences, as caused by the wind wake of the support tower e and by the inherent flexibility of the blades b. Blade flexibility is another substantial cause of such shaft perturbations when large-diameter blades are used. As a rotating rotor blade b nears vertical position, the gravitational force which had flexed it in one direction now flexes it in the opposite direction, causing a reversal of perturbance in the rotor shaft angular velocity.

Whether there is an actual change in rotor velocity or merely a cyclic perturbation, even a small change in rotor shaft velocity, such as one which might cause a 1° lead at the rotor blade b, would amount to a 45° lead at the alternator after being multiplied by the speed increaser 10. Such a phase change in the alternator output is unsuitable for reliable power generation and may destroy the alternator.

The surge-accepting accumulator transmission accommodates these disturbances in the normal rotor shaft angular velocity by further rotating, in the required direction from its previously displaced position, at a rate substantially equal to the difference between the rotor shaft normal angular velocity and the rotor shaft instantaneous angular velocity. Rotation of the ring gear 12 accompanies rotation of the torque reaction gear 21 coupled to the hydraulic motor 22, which delivers hydraulic fluid either into or out of the accumulator 23. By the accumulator gas pressure, increased as more fluid is received and diminished as it delivers fluid, the resistive torque provided will be sufficient to either permit or cause such differential rotation, as required. These elements are also selected to afford that maximum permitted angular displacement of the ring gear 12 which provides a sufficient time interval to return the rotor shaft c to its normal angular velocity, as if increased by a gust or decreased by a lull. Due to the large mass of the rotor blades and their dynamic characteristics generally, such time interval may be considerable. A relatively large angular displacement—for example, between 360° and 720°—may suitably be provided by the capacities of the reservoir 26 and accumulator 23 relative to the delivery rate of the hydraulic motor 22.

During this time interval, any change in the rotor shaft angular velocity or torque accompanying displacement of the ring gear 12 is sensed by the processor 40, which receives signals from the pair or proximity sensors 31 angularly displaced from each other adjacent the ring outer teeth 13; thus both direction of rotation and displacement may be determined by the processor 40. By differentiating, the processor 40 also computes the gear case angular velocity and angular acceleration.

The time interval provided by the permitted angular displacement of the speed increaser 10 is further sufficient to permit the pitch change mechanism to effect such change in the pitch changeable rotor blades b as will result in a return of the rotor shaft c to its normal angular velocity 40 r.p.m. The pitch change is determined by the processor 40 as a function of the gear case displacement and angular acceleration as well as of the rotor shaft angular velocity. The dynamic control properties of the wind rotor a, such as its inertial resistance to pitch change, may require a time interval equal to several rotor revolutions to return the rotor shaft c to its normal operating velocity.

By the two-stage accumulator 23, two operating ranges are provided. In the low torque operating range, for which the average wind speed is such that the alternator p is operating at less than its rated power, the low pressure stage 24 accommodates wind lulls and gusts which do not exceed the rated power of the alternator. Since the bladder 28 of the second stage 25 is precharged to a pressure equal to the pressure of the first stage 24 at the rated value of the alternator p, the second stage 25 becomes effective if a gust exerts more than rated torque on the rotor; the accumulator then operates in the high torque operating range. Further rotation of the ring gear 12 is accommodated by the second stage 25, but the pressure in the accumulator 23 not increases less rapidly relative to displacement of the ring gear 12. For the same increase in torque, the angle of rotation of the ring gear 12 is now greater; the remaining travel of the ring gear 12 afforded by the accumulator 23 accommodates the increased torque which may exceed the alternator's rated value by 30%-50%. The alternator is able to accept such transients without damage.

There is a specific accumulator torque and hence, a specific angular position of the ring gear 12 corresponding to the rated power of the alternator p. These are achieved at a wind speed which marks the change from a low wind operating range to a high wind operating range. When the averge power in the wind is equal to or exceeds the alternator rated value, the angle of the rotor blade b is decreased as required to deliver only rated power to the alternator p and the system operates in the high-wind operating range; except when a lull drops the power in the wind to less than alternator-rated power, then operation is in the low-wind operating range. After each gust which drives the ring gear 12 from its positon corresponding to alternator-rated torque, the processor 40 decreases the blade pitch for sufficient time for the ring gear 12 to return to zero acceleration, to normal angular velocity, and finally to the angular position corresponding to the alternator rated power. The conditions are determined by the processor 40 via signals from the proximity sensors 31 indicating the passage of the ring gear.

The operative principles of the alternative embodiment of FIGS. 4, 5 and 6 are like those of the preferred embodiment, but operation is achieved by different apparatus. The alternator p is mounted to the speed increaser case 51, rotating with the case 51. Control of rotation of the speed increaser case 51 is achieved by the roller chain 90 coupled to the hydraulic cylinder 70. As the rotor a turns at its normal operating angular velocity, the hydraulic cylinder 70 provides a torque reaction which stabilizes the speed increaser case 51 in a stable position; the alternator p is then rotating at 1800 r.p.m. to produce 60 Hz alternating current. If a change in the normal angular velocity of the rotor a should occur, due to change in wind speed or one of the cyclic fluctuations described above, the torque reaction afforded by the hydraulic cylinder will no longer balance the torque then delivered by the rotor at its then instantaneous angular velocity. To restore such balance, the piston 73 in the hydraulic cylinder 70 will move subject to the two-stage accumulator 80, causing rotation of the speed increaser case 51 in the appropriate angular direction at a rate substantially equal to the difference between the rotor shaft normal angular velocity and the rotor shaft instantaneous angular velocity, to maintain the alternator p substantially at its normal angular velocity corresponding to 60 Hz.

The angular displacement of the speed increaser case is a function of the torque supplied by the rotor a. As the torque increases, the speed increaser case 51 is rotated to a new position subject to a higher balancing torque by the hydraulic cylinder-accumulator system. This, in effect, provides a reserve source of rotary movement, available for delivery to the speed increaser case 51 if the rotor speed should fall.

The rotor a is generally maintained at its normal operating angular velocity by the sprocket driven governor 110, which changes the rotor blade pitch. For sudden changes in wind speed, the acceleration-sensitive pitch control 97 makes compensations. When the speed increaser case 51 rotates or accelerates slowly, fluid is delivered slowly through the orifice passage 98 to the opposite side of the hydraulic pump 95 without affecting the pitch control. If the acceleration is greater, so that the rate of flow from the pump 95 is too large to pass through the orifice passage 98, the excess fluid moves the piston 100, subject to the soft centering springs 101, to deliver fluid from one side of the pump 95 and return fluid to the other side. This movement of the piston 100 causes the control arm 102 to provide a corrective blade pitch change input; large blade pitch changes to either speed or slow the rotor may be effectuated in this manner. Should the rapid flow of hydraulic fluid continue after the piston 100 reaches the full extent of its travel, the pressure relief value 103 by-passes such excess fluid. The centering springs 101 gradually return the piston 100 to centered position by forcing the fluid through the parallel orifice passage 98, thus relieving the blade pitch change input by the control arm 102 as the normal rotation of the rotor is restored.

Varying embodiments of the present invention may include the features of the above embodiments in other combinations or in modified form. For example, a hydraulic motor, accumulator and reservoir system, such as in the preferred embodiment, could be utilized in the described alternative embodiment in lieu of the hydraulic cylinder accumulator arrangement. As is apparent, any speed increaser with a correct gear ratio which has a gear case to which a torque reaction may be applied could be utilized; for example, it may be a gearbox or a chain-and-sprocket speed increaser. Any number of control devices for start-up, pitch change and excitation control may be utilized. The means to resist rotation of the speed increaser relative to the input shaft may consist of any suitable torque reaction mechanism which reacts with increasing fluid resistance from a zero torque position to an angular position removed therefrom at which the torque afforded by the resistance balances a selected alternator torque; both reaction and displacement will vary with the torque transmitted from the wind rotor to the alternator. The fluid transfer means may be a hydraulic motor, hydraulic cylinder or other fluid device which will both do work or have work performed upon it. The means to resist rotation should have an angular range sufficient to afford a time interval equal to or greater than the time lag required, dependent upon the dynamic properties of the rotor, in sensing a change in the wind speed or rotor shaft angular velocity and conpensating therefor by blade pitch change.

Further, a variety of means may be used to sense rotation of the speed increaser, such as photocells, electromagnetic devices or a hydraulic motor gear-coupled to the speed increaser case. The control for pitch change may cause pitch changes as a function of the speed increaser angular position, angular velocity, angular acceleration or any combination thereof, as well as rotor shaft speed.

These and other modifications will, from this disclosure, be apparent to persons skilled in the art.

I claim:

1. A wind-driven generator comprising
  A. an electrical generator,
  B. a wind-responsive rotor mounted on a rotor shaft,
  C. a speed-increasing transmission having
    (i) an input shaft coupled to the rotor shaft,
    (ii) an output shaft coupled to the generator, and
    (iii) alternative output means differentially coupled to the output shaft, together with
  D. means, coupled to said alternative output means, to receive and accumulate energy, exerting and maintaining on said alternative output means a reactive torque increasing with rotation of said alternative output means caused by an increase of power delivered by the rotor,
  whereby at a design operating condition, rotor shaft torque is so balanced by such reactive torque as to normally transmit power to said output shaft only, and rotor power fluctuations will cause or permit angular movements of the alternative output means in such sense as to smooth the delivery of power to the output shaft.

2. A wind-driven generator as defined in claim 1 in which
  the electrical generator is an alternator suited for coupling to an a.c. utility grid,
  whereby when rotor power fluctuates, changes in power angle of the alternator are lessened by angular movements of said alternative output means under the urging of such reactive torque.

3. A wind-driven generator as defined in claim 1, wherein said means coupled to said alternative output means comprises
  hydraulic motor means coupled to the rotation of said transmission case in a hydraulic line between a reservoir means and an accumulator means.

4. A wind-driven generator as defined in claim 1, wherein said means coupled to said alternative output means comprises
  a hydraulic actuator containing a supply of hydraulic fluid and
  an accumulator to which the actuator is so coupled as to deliver fluid thereto on increase of applied torque and receive fluid therefrom on decrease of applied torque.

5. A wind-driven generator as defined in claim 1, in which
  the wind-responsive rotor has blade means presentable to the wind at variable angles, in combination with
  means to vary the angles of presentation of such blades in response to changes in such reactive torque.

6. A wind-driven generator as defined in claim 1, in which
  the wind-responsive rotor has blade means presentable to the wind at variable angles, in combination with
  means to vary the angles of presentation of such blades in response to speed of rotation of said alternative output means.

7. A wind-driven generator as defined in claim 1, in which
  the wind-responsive rotor has blade means presentable to the wind at variable angles, in combination with
  means to vary the angles of presentation of such blades in response to rotational acceleration of said alternative output means.

8. A wind-driven generator as defined in claim 5,
  said means to accept and accumulate energy exerting and maintaining a reactive torque having capacity to accept rotation of said alternative output means over substantially that time interval required to so vary the angles at which the blades are presented as to restore the rotor to design speed of rotation.

9. A wind-driven generator comprising
  a wind-responsive rotor mounted on a rotor shaft,
  an electrical generator,
  structural means to support the rotor shaft and generator in secured position,
  a speed-increasing transmission mounted on said structural support means coupled between the rotor shaft and the generator, said transmission being of the type having input gear means coupled to the rotor shaft and two differential output gear means, the first of which is coupled to the generator, and
  means, coupled in torque-communicating relation with the second of said output gear means, to accumulate energy as exerts and maintains on said output gear means a reactive torque increasing with the rotation of said second output gear means caused by increase of power delivered by the rotor,
  whereby after the rotor has reached a selected design operating condition at which said second output gear means has so rotated as to be balanced by such reactive torque, and thereby to cause all rotor power to be normally delivered to the generator, fluctuations of rotor shaft torque, opposed by such reactive torque, will cause or permit rotation of such second output gear means in such sense as to smooth the delivery of power to the generator.

10. A wind-driven electric generator comprising
  an electrical generator,
  a wind-responsive rotor having a rotor shaft,
  structural means to support said rotor shaft in secured position,
  a speed-increasing transmission having a transmission case, an output shaft coupled to the rotor shaft, and an output shaft,
  the transmission case being mounted and supported for rotation about the transmission input shaft, whereby its rotation may serve as a differential output of said transmission,
  an electrical generator fixably mounted onto said transmission case, whereby to rotate therewith, and having a generator input shaft coupled to the output shaft of the transmission, and
  means, coupled in torque-communicating relation with the transmission case so rotatably mounted, to accumulate such energy as exerts and maintains on said transmission case a reactive torque increasing with its rotation in that sense caused by increase of power delivered by the rotor and decreasing in the opposite sense.

11. A wind-driven electrical generator as defined in claim 10, in which the position in which said generator is so mounted balances the transmission for rotary movements about its input shaft.

* * * * *

UNITED STATES PATENT AND TRADEMARK OFFICE
CERTIFICATE OF CORRECTION

PATENT NO. : 4,239,977
DATED : December 16, 1980
INVENTOR(S) : Warren A. Strutman It is certified that error appears in the above—identified patent and that said Letters Patent is hereby corrected as shown below:

In column 3, line 57, insert a space between "conventional" and "electronic".
In column 6, line 52, delete "or" and insert ---of---.
In column 6, line 63, insert ---of--- between "velocity" and "40 r.p.m.".
In column 7, line 17, delete "not" and insert ---now---.
In column 8, line 32, delete "value" and insert ---valve---.
In column 8, line 67, delete "conpensating" and insert ---compensating---.

In Claim 10, column 10, line 48, delete "output" and insert ---input---.

Signed and Sealed this

Twenty-first Day of April 1981

[SEAL]

Attest:

RENE D. TEGTMEYER

*Attesting Officer*  *Acting Commissioner of Patents and Trademarks*